Aug. 8, 1939.                C. J. HIMEL                2,168,339
                              ANT TRAP
                         Filed Dec. 16, 1938
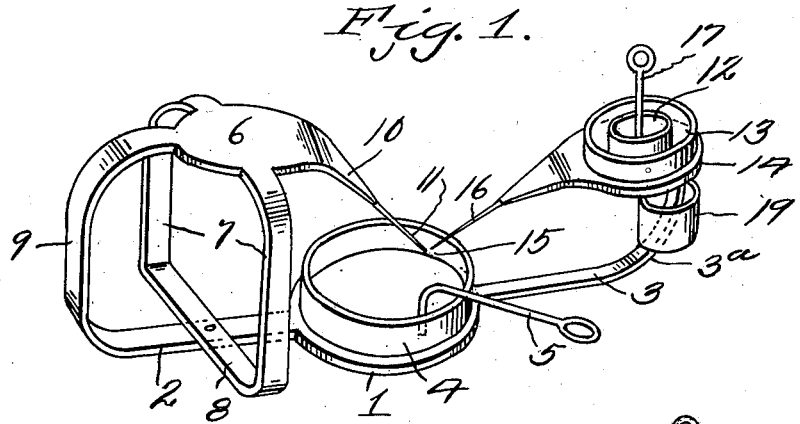
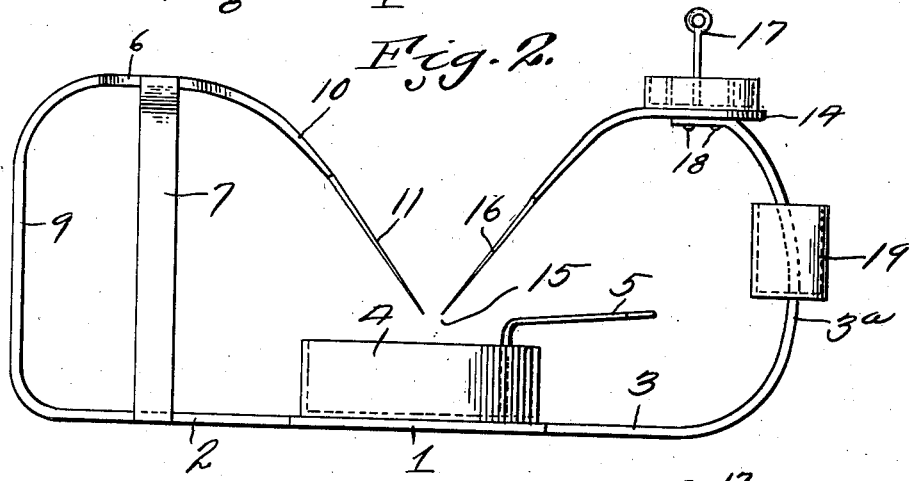
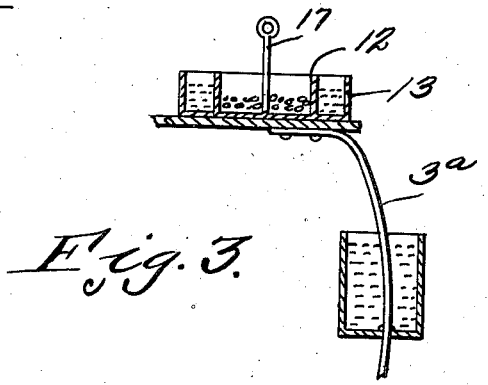
Inventor
Curtis J. Himel
By Philip A. H. Terrell
Attorney Patented Aug. 8, 1939

2,168,339

UNITED STATES PATENT OFFICE 2,168,339

ANT TRAP

Curtis J. Himel, New Orleans, La.

Application December 16, 1938, Serial No. 246,194

6 Claims. (Cl. 43—121)

The invention relates to ant traps, and has for its object to provide a device of this character comprising an insecticide receptacle disposed between elevated ant runways, which runways are provided with downwardly and inwardly inclined pointed members terminating above the receptacle and spaced apart whereby ants fall into the receptacle in trying to pass from one pointed member to the other.

A further object is to provide a bait receptacle on one of the runways for attracting the ants across the gap between the pointed members and means whereby ants will have to return over the gap if any of them succeed in passing.

A further object is to dispose the bait receptacle within an insecticide receptacle so the ants will have to pass the insecticide to reach the bait, hence their line travel will be diverted back towards the gap.

A further object is to provide means whereby ants will enter the trap in a plurality of lanes comprising upwardly extending members at opposite sides and at the ends of one end of the trap.

A further object is to provide the arm, supporting the bait receptacle, with a cup shaped member extending around the arm and adapted to receive insecticide for preventing ants from entering the trap at the rear end thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the trap.

Figure 2 is a side elevation of the trap.

Figure 3 is vertical longitudinal sectional view through the rear end of the trap.

Referring to the drawing, the numeral 1 designates the base of the frame, which base is provided with oppositely extending arms 2 and 3, adapted to rest on the ground. Disposed on the base 1 is an insecticide receiving receptacle 4 having a handle 5 anchored in the bottom of the receptacle and spaced from the wall of the receptacle so insecticide will entirely surround the handle portion within the receptacle. Disposed above the arm 2 is a substantially horizontal platform 6 above the receptacle 4 and connected to the arm 2 by means of oppositely disposed downwardly extending arms 7 terminating in a horizontal portion 8, which may be secured to the arm 2 in any suitable manner. The arms 7 form runways up which ants will pass to the platform 6 in separate lines. The outer end of the arm 2 is provided with an upwardly and inwardly extending runway arm 9 merging into the platform 6 for forming an additional runway.

By providing a plurality of runways 7 and 9 the lines of ant trapping will merge on the platform 6 and will follow down the inclined portion 10 thereof onto the needle 11 above the receptacle 4 in an attempt to reach the bait receptacle 12 within the food receptacle 13 on the rear platform 14. As the ants attempt to cross the gap 15 between the needle 11 and the needle 16 they will fall into the insecticide receptacle 4 and be killed. If any of the ants succeed in passing the gap 15, incident to clustering on the points, they will pass up the needle 16 to the rear platform 14 in an attempt to reach the bait in the receptacle 12, however they are prevented from doing so and will pass around the receptacle 13 which is smaller than the platform 14 and then will pass downwardly to the needle 16 and attempt to pass the gap 15 where they will fall into the receptacle 4. The receptacle 13 is preferably provided with an upwardly extending handle member 17 so it can be easily handled and removed from the platform 14 when desired.

Arm 3 extends rearwardly and upwardly and is connected at 18 to the under side of the platform 14. As the device rests on the ground it is desirable to provide means for preventing ants entering the trap from the rear thereof, and to accomplish this, an insecticide receiving receptacle 19 is provided, through which the upwardly extending portion 3a of the arm 3 extends.

From the above it will be seen that an ant trap is provided which is simple in construction and one wherein a plurality of lines of ant traffic are brought together and directed over a gap between pointed members above an insecticide receptacle and any ants which may pass the gap will be diverted back over the gap, and prevented from leaving the trap at the rear end thereof.

The invention having been set forth what is claimed as new and useful is:

1. An ant trap comprising a frame adapted to rest on ground, a forward platform to one side of the support, a rear platform to the rear side of the support, an insecticide receptacle between and below said platforms, a bait receptacle on the rear platform, the forward platform being supported by spaced ant runways, the inner sides of said platforms terminating in needle ends inclined downwardly and inwardly and terminating in spaced relation above the receptacle between the platforms.

2. A device as set forth in claim 1 wherein the rear platform is supported by a rearwardly and upwardly extending arm and an insecticide receptacle surrounds said arm below the platform.

3. A device as set forth in claim 1 wherein the bait receptacle is disposed within an insecticide receptacle on the rear platform.

4. A device as set forth in claim 1 wherein the receptacles are provided with handle members extendinging upwardly therefrom in spaced relation to the walls thereof.

5. An ant trap comprising a frame, a removable insecticide receptacle carried by said frame spaced from its ends, ant runways extending upwardly from the bottom of the frame, said ant runways merging into a platform, said platform terminating in a downwardly and inwardly extending pointed member disposed above the receptacle and bait means for attracting ants over said runways, platform and pointed member.

6. A device as set forth in claim 1 wherein the rear platform is of greater width than the receptacle thereon whereby ants may pass around the receptacle on the platform.

CURTIS J. HIMEL.